United States Patent [19]

Kallio-Könnö

[11] 4,210,870
[45] Jul. 1, 1980

[54] SIGNAL TRANSMITTING SYSTEM
[75] Inventor: Kari Kallio-Könnö, Helsinki, Finland
[73] Assignee: Vaisala Oy, Finland
[21] Appl. No.: 973,796
[22] Filed: Dec. 28, 1978
[51] Int. Cl.² ................ H04B 1/70; H04B 1/034
[52] U.S. Cl. ........................... 455/95; 455/45; 455/98
[58] Field of Search ............ 325/113, 61, 63, 145, 325/146, 45, 48, 153, 148, 115, 47, 139, 30, 163; 340/207 R, 201 K, 208

[56] References Cited
U.S. PATENT DOCUMENTS
3,475,742  10/1969  Whitney et al. ............... 325/113

FOREIGN PATENT DOCUMENTS
29786  7/1953  Finland ........................ 325/113

OTHER PUBLICATIONS

"Model T-20B Strain Bridge FM/FM Telemeter", Inmet, Ing., 11/1/72.
Govind, "Dropwindsonde Instrumentation for Weather Reconnaissance Aircraft", Journal of Applied Meteorology, vol. 14, No. 8, pp. 1512–1520, Dec. 1975.
Pickering, "The Radiosonde", Proceeding of the I.R.E., vol. 31, No. 9, 9/1943, pp. 479–485.

Primary Examiner—Robert L. Griffin
Assistant Examiner—Alexander Gerasimow
Attorney, Agent, or Firm—Steinberg & Blake

[57] ABSTRACT

A capacitive signal dependent upon a quantity being measured is produced by capacitive sensors of a radiosonde. An oscillator in the radiosonde has an output frequency, controlled by the capacitive signal, in the order of 1 to 10 MHz. The output frequency of the oscillator is divided by a factor of $2^7$. A high frequency transmitter in the radiosonde is frequency modulated by a frequency $$f_{M1} = f_{M0}/d$$

wherein $f_{M1}$ is the output frequency of the divider and $f_{M0}$ is the input frequency of the divider.

7 Claims, 2 Drawing Figures

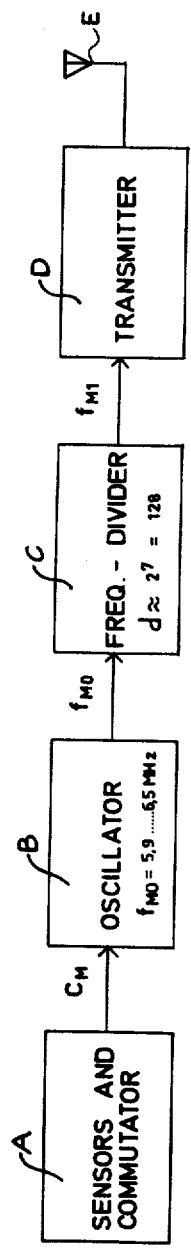
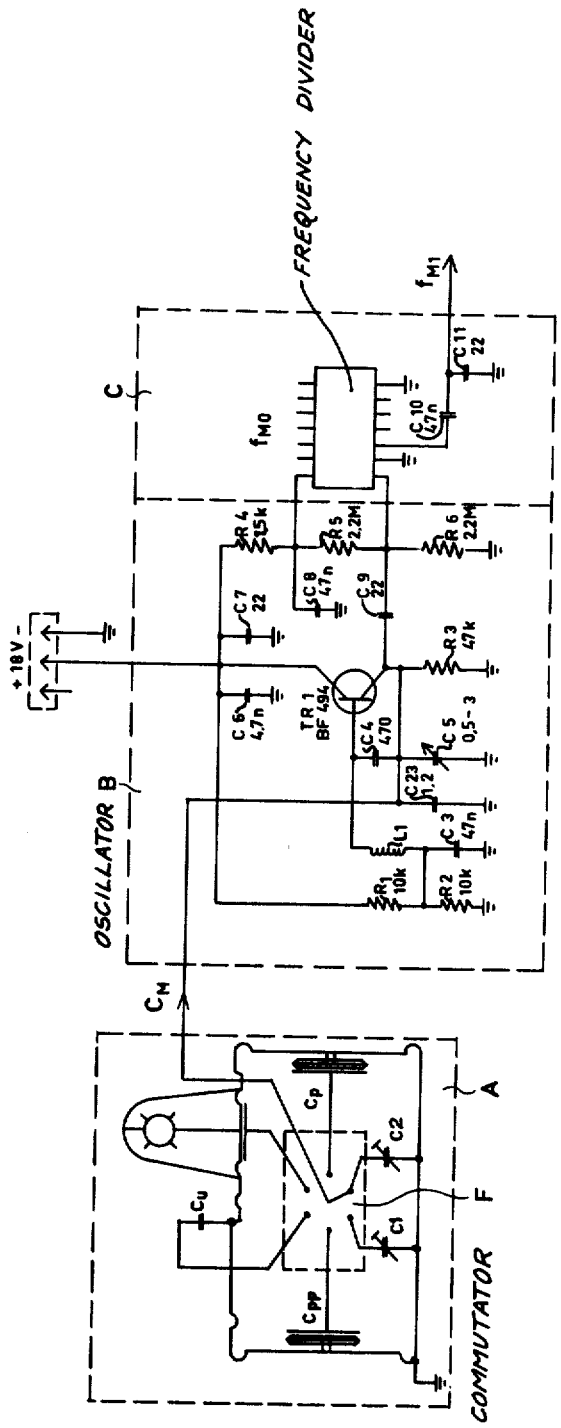

SIGNAL TRANSMITTING SYSTEM

BACKGROUND OF THE INVENTION

The present invention relates to a signal transmitting system. More particularly, the invention relates to a signal transmitting system for transmitting signals measured by capacitive sensors in a radiosonde to a surface station via radio transmitter.

A previously known radiosonde signal transmitting system utilizes capacitive sensors which are sequentially connected to the oscillating circuit of an oscillator. The frequency of the oscillator depends upon the quantity being measured; that is, temperature, pressure, or relative humidity. In the known method, the radio transmitter of the radiosonde, which operates at a frequency of 403 MHz or 1680 MHz, is modulated by the frequency of the oscillator or by a frequency derived from the frequency of the oscillator.

Due to the relatively low capacitances of sensors and because of high measuring accuracy requirements, measuring oscillators operating directly on the modulation frequency are out of the question. In the first place, high resistances of 1 to 2 megohms do not meet reliability and stability requirements as far as, for example, temperature, humidity, and aging are concerned. On the other hand, the coils would require such a high stability and such low stray capacitances, that they are out of question in the present application. It is undesirable to connect the sensor capacitor directly to the oscillating circuit of, for example, a 400 MHz oscillator, because of the bulkiness of the sensor capacitors and the high inductances of the wires of the change-over switches.

SUMMARY OF THE INVENTION

The principal object of the invention is to provide an inexpensive disposable transmitter which provides a transmitting power of the order of 1 W in available frequency ranges to insure good communication from a radiosonde to a surface station, even over a distance of 300 km.

Another object of the invention is to provide a signal transmitting system utilizing existing and tested sensors of relatively low capacitances, in most cases under 10 picofarads.

A carrier wave modulation system requires the smallest number of electronic components and adjustments to transmit information via a transmitted signal. Since this system has proven to be simpler and more economical than, for example, adding an appropriate frequency to the basic oscillator frequency via a power mixer, which would produce an output frequency of 403 MHz, still another object of the invention is to provide a further developed carrier modulation system.

In accordance with the invention, the aforestated objects are attained by a system and method in which a capacitive signal dependent upon the quantity being measured is provided. The capacitive signal controls an oscillator having an output frequency to the order to 1 to 10 MHz in a manner whereby the output frequency is dependent upon the capacitive signal. The output frequency of the oscillator is divided by a factor d, which is of the order of $2^6$ to $2^8$, preferably $2^7$, and frequency modulates the high frequency transmitter of the radiosonde with a frequency $$f_{MI} = f_{MO}/d,$$

wherein $f_{MI}$ is the output frequency of the divider and $f_{MO}$ is the input frequency of said divider.

In accordance with the invention, the measuring oscillator is preferably operated in a frequency range of 5.9 to 6.5 MHz, and a suitable modulating frequency is created by dividing the oscillator frequency to a sufficiently low level, and simultaneously maintaining it high enough for the required measuring accuracy. In accordance with the invention, the most suitable division factor d is $2^7 = 128$.

BRIEF DESCRIPTION OF THE DRAWINGS

For a fuller understanding of the invention, reference is had to the following description taken in connection with the accompanying drawings, in which:

FIG. 1 is a block diagram of an embodiment of the signal transmitting system of the invention; and FIG. 2 is a circuit diagram of the sensors and oscillator of the embodiment of FIG. 1.

DESCRIPTION OF PREFERRED EMBODIMENTS

In FIGS. 1 and 2, block A indicates the capacitive sensors of a radiosonde. A commutator F (FIG. 2) transfers the measuring signals sequentially to an oscillator B. In FIG. 2, capacitances $C_p$ and $C_{pp}$ represent quantities being measured and capacitances C1, C2 and Cu represent reference capacitances. The rotating commutator F obtains its operating power from a wind motor, for example. A capacitive signal $C_M$, which depends on measured quantities such as ambient temperature, pressure, and relative humidity, is provided by the sensors A. The capacitance level of the capacitive signal $C_M$ is of the order of 10 picofarads, and is less than that, in most cases.

FIG. 2 illustrates the oscillator B in greater detail. The output frequency $f_{MO}$ of the oscillator B varies in the range $f_{MO} = 5.9$ to 6.5 MHz, depending upon the capacitive signal $C_M$.

As shown in FIG. 2, the active component of the oscillator B is a transistor TR1. The resonance circuit determining the oscillating frequency of the oscillator B comprises a coil L1 and the following capacitances, connected in parallel with said coil. These capacitances are the sensor capacitance $C_M$, capacitance C5 for the fine adjustment of the frequency, and capacitance C9, which is in series with the input capacitance of the frequency divider. The transistor TR1 has a feedback condenser C4.

Resistors R1 and R2 are connected to the base electrode of the transistor TR1. Resistors R5 and R6 determine the input DC level of the frequency divider C microcircuit so that said divider operates at the greatest stability, taking into account the variation of the oscillator amplitude. Capacitances C3, C6, C7, C8, C10, and C11 are bypass and switch-on capacitors.

In accordance with the invention, the dividing factor d of the frequency divider C is of the order of $2^6$ to $2^8$, preferably $2^7 = 128$. The output frequency $f_{MI}$ of the frequency divider C, that is, the modulation frequency of the high frequency transmitter of the radiosonde, is therefore lower than 100 kHz. In the discussed case, the output frequency $f_{MI}$ of the frequency divider C is 50 MHz.

A high frequency transmitter D, having an antenna E (FIG. 1) is provided in the radiosonde and is frequency modulated at the divided frequency $f_{MI}$, produced in accordance with the invention. The frequency of the transmitter D is, for example 400.5 to 406 MHz or 1660 to 1700 MHz. These frequencies may be used for the aforementioned purpose.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A signal transmitting system for transmitting signals from a radiosonde to a surface station, said signal transmitting system comprising
    capacitive sensors in the radiosonde for producing capacitive signals dependent upon a quantity being measured;
    an oscillator in the radiosonde having an output frequency controlled by the capacitive signals, said output frequency being dependent upon said capacitive signals;
    a frequency divider for dividing said output frequency by a factor d of the order of $2^6$ to $2^8$, said divider having an input frequency and an output frequency; and
    a high frequency radio transmitter in the radiosonde frequency modulated by a frequency $$f_{MI} = f_{MO}/d$$

wherein $f_{MI}$ is the output frequency of said divider and $f_{MO}$ is the input frequency of said divider.

2. A signal transmitting system as claimed in claim 1, wherein the output frequency of said oscillator is in the range of 1 to 10 megaHertz.

3. A signal transmitting system as claimed in claim 1, wherein the output frequency of said oscillator is in the range of 5.9 to 6.5 megaHertz.

4. A signal transmitting system as claimed in claim 1, wherein said capacitive signals have a level in the order of 10 picofarads.

5. A signal transmitting system as claimed in claim 1, wherein the high frequency transmitter has a frequency of 400 to 1700 megaHertz.

6. A signal transmitting system as claimed in claim 1, wherein the high frequency transmitter has a modulation frequency less than approximately 100 megaHertz.

7. A method of transmitting signals from a radiosonde having capacitive sensors, an oscillator, a frequency divider with an output frequency $f_{MI}$ and an input frequency $f_{MO}$ and a high frequency radio transmitter to a surface station, said method comprising
    producing capacitive signals dependent upon a quantity being measured;
    controlling the output frequency of the oscillator by the capacitive signals so that said output frequency is dependent upon said signals;
    dividing the output frequency of the oscillator by a factor d of the order of $2^6$ to $2^8$; and
    frequency modulating the high frequency radio transmitter by a frequency $$f_{MI} = f_{MO}/d.$$

* * * * *